June 14, 1938.  G. A. THOMPSON  2,120,771
ELECTRIC LEVEL INDICATOR
Filed Aug. 14, 1934  3 Sheets-Sheet 1

Inventor
G. A. Thompson
By Clarence A. O'Brien
Attorney

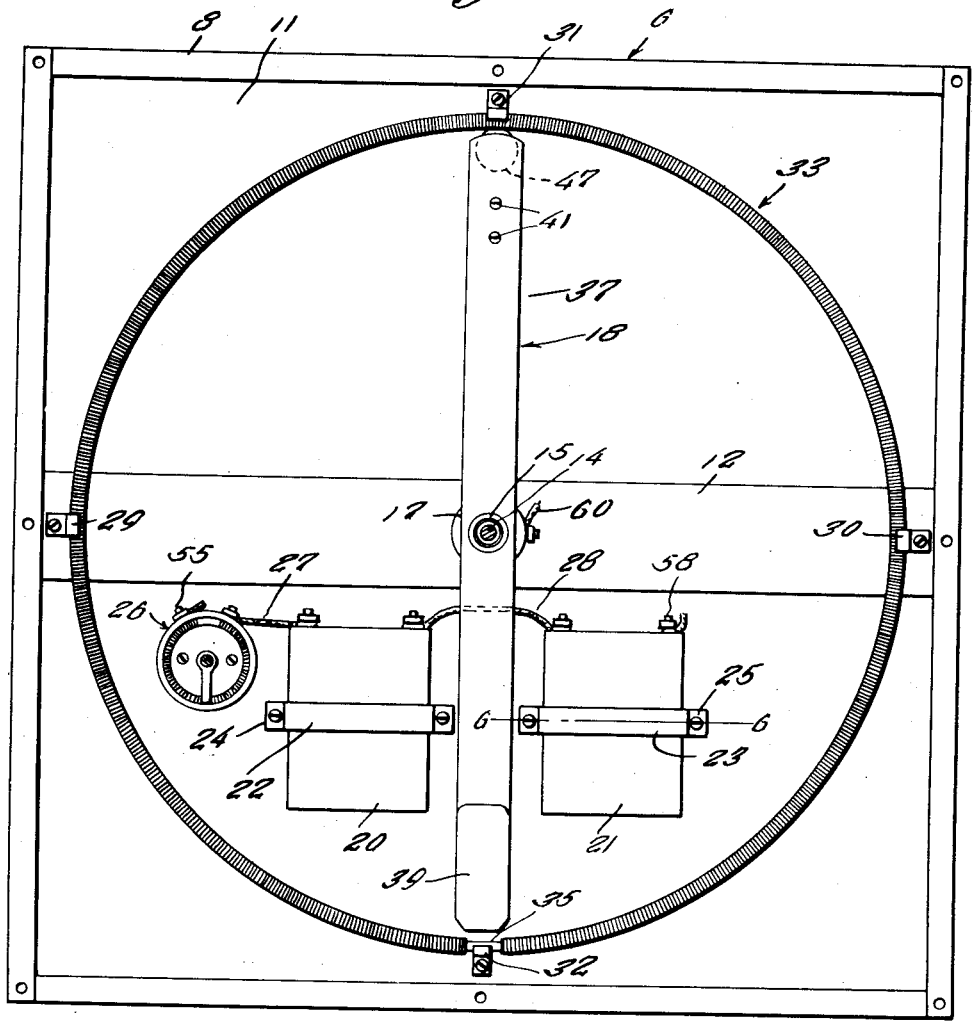
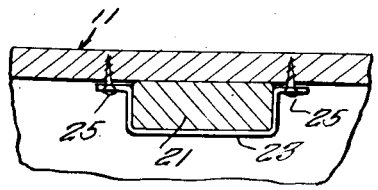

June 14, 1938.　　　　G. A. THOMPSON　　　　2,120,771
ELECTRIC LEVEL INDICATOR
Filed Aug. 14, 1934　　　3 Sheets-Sheet 3

Inventor
G. A. Thompson
By Clarence A. O'Brien
Attorney

Patented June 14, 1938

2,120,771

UNITED STATES PATENT OFFICE 2,120,771

ELECTRIC LEVEL INDICATOR

George A. Thompson, Chicago, Ill.

Application August 14, 1934, Serial No. 739,798

1 Claim. (Cl. 201—55)

My invention relates generally to instruments for use on aircraft, watercraft, and in building operations to indicate inclination with respect to the horizontal plane, and particularly to an electrical level indicator of simplified and more accurate form wherein the indicating dial may be located at a distance from the level finding element; and an important object of the invention is to provide a level indicator of the character stated which accurately indicates the divergence of an object upon which the indicator is mounted from the plane commonly spoken of as the horizontal plane, and which is supposed to be right angularly disposed with respect to any line extended normal to the surface of the earth, the device containing a gravity operated controlled element which is connected by electrical means for operating a dial arranged to show the degrees of the divergence, in the degrees of a circle.

Other objects and advantages of my invention will be apparent from a reading of the following description in connection with the drawings, wherein for purposes of illustration I have shown a preferred embodiment of my invention.

In the drawings:—

Figure 2 is a side elevational view of one of the members of the unit with the side of the casing removed and disclosing the interior mechanism.

Figure 6 is a horizontal sectional view taken approximately on the line 6—6 of Figure 2.

Referring in detail to the drawings, the numeral 5 refers generally to the complete unit which is composed of a member 6 arranged transversely of and at right angles to the longitudinal axis of the aircraft or other support so as to be capable of indicating lateral divergence from the horizontal plane, and the numeral 7 designates the second member of the unit which is arranged parallel with the longitudinal axis so as to be capable of indicating dip or climb inclinations. The members 6 and 7 are identical in construction but arranged at right angles with respect to each other. Since the construction of each of the members 6 and 7 is the same, the description of one will suffice for the description of the other.

Figure 3:
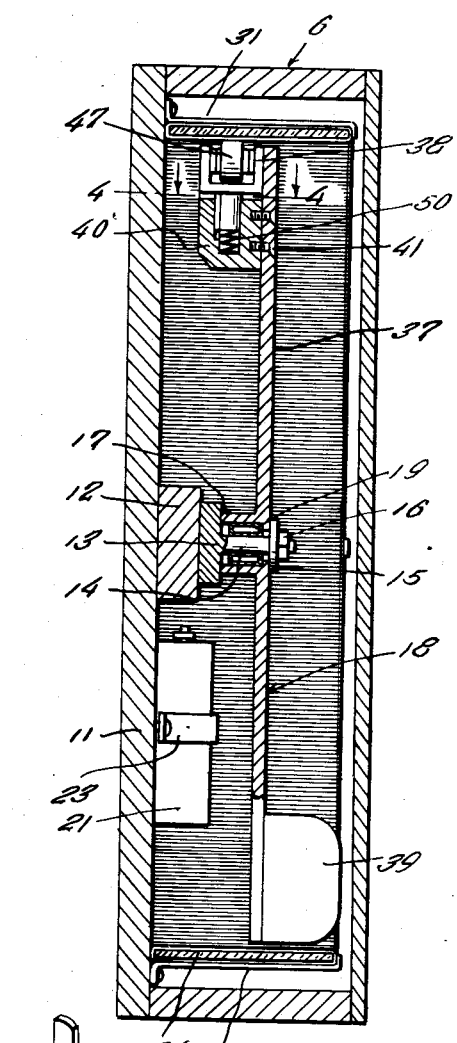
Figure 3 is a transverse vertical sectional view through Figure 2 taken on an approximately central plane.
Figure 4:
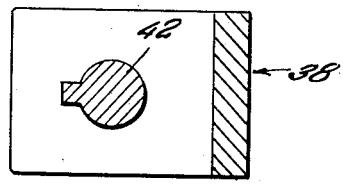
Figure 4 is a horizontal sectional view taken through Figure 3 approximately on the line 4—4 and looking downwardly in the direction of the arrows.
Figure 5:
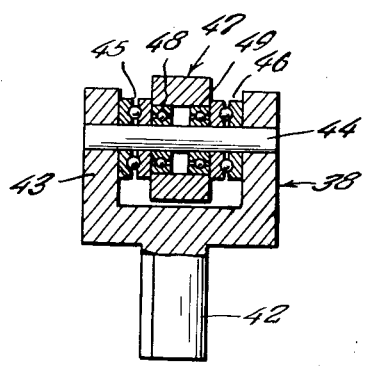
Figure 5 is a transverse vertical sectional view through the roller brush.
Figure 9:
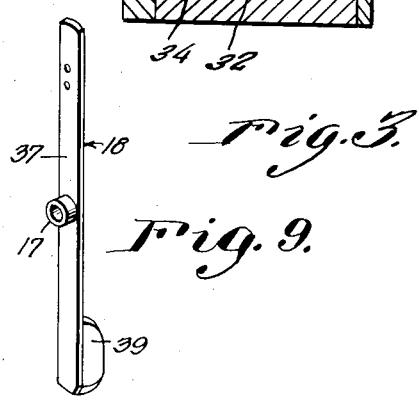
Figure 9 is a perspective view of the pendulum contactor.

The member 6 comprises a relatively narrow casing generally designated 8 and which has the removable side 9 held in place by bolts or screws 10. To the opposite side 11, which is of heavier gauge, is attached the horizontal bar 12 which extends the length of the casing and has mounted at the center thereof the block 13 carrying the stub shaft 14 having the washer 15 thereon confined by the nut 16 which is threaded on the outer end of the stub shaft as shown in Figure 3, so that the washer 15 confines on the stub shaft 14 the hub portion 17 of the gravity affected element generally designated 18, this hub portion containing roller bearings 19 whereby the gravity affected element 18 is delicately balanced and easily rotated on the stub-shaft by a change in inclination of the casing 8, such as takes place in a list to one side or the other or in the case of a dive or climb of an aircraft or watercraft.

On the side 11 below the bar 12 is a pair of dry or other suitable type of batteries 20, 21 each of which is held in place by a U-shaped strap 22, 23, respectively, anchored as indicated at 24, 25, respectively, to the side 11. To the left of the battery 20 there is mounted an adjustable rheostat 26 which has one side connected by the conductor 27 to one side of the battery 20, the remaining side of the battery 20 being connected to one side of the battery 21 by the conductor 28.

Figure 1:
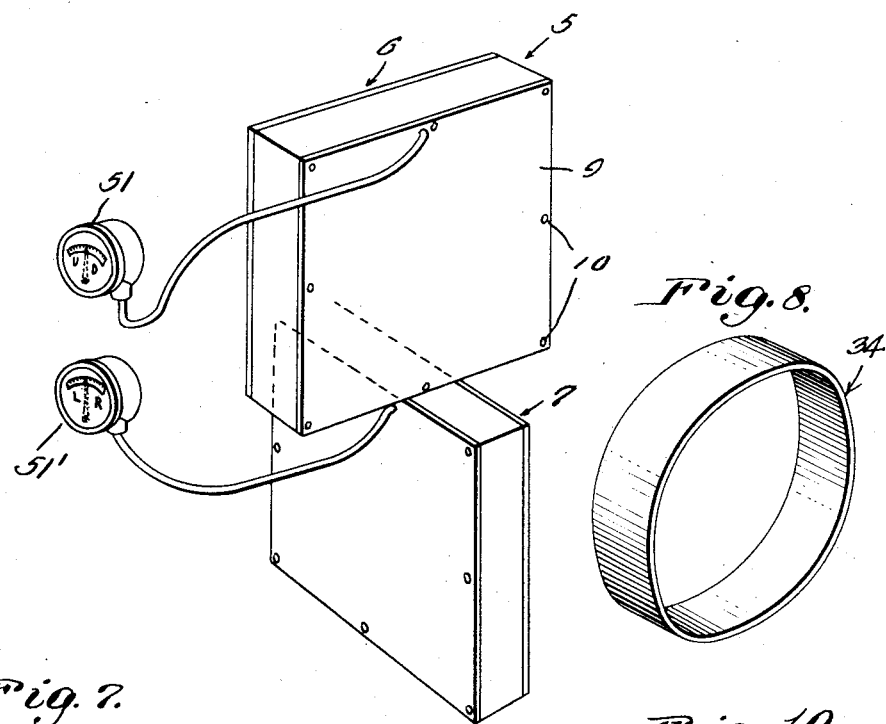
Figure 1 is a perspective view of a complete unit in accordance with the invention.
Figure 8:
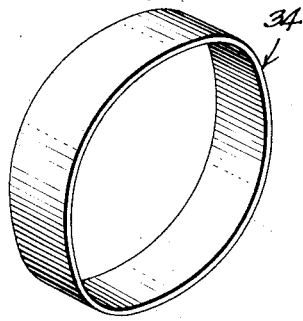
Figure 8 is a perspective view of the circular coil form.

Short brackets 29, 30, respectively, anchored to the bar 12 and longer brackets 31, 32, anchored to the side 11 embrace at points separated at 90 degrees of the circumference thereof a circular resistor unit which is generally designated 33, which is composed of a flat annular or cylindrical dielectric form 34, shown in Figure 8, upon which is wound for a distance of 355 degrees of the circumference thereof, suitable resistance wire 35. The unwound 5 degree portion 35' is arranged at the bottom when the resistor is properly positioned in the casing 8 and held in place by the brackets mentioned and indicated in Figures 2 and 3.

The wire 35 is so wound in turns on the form 34 that the resistance offered by the wire when contacted at equidistant points from either end thereof in one direction will offer equal resistance. In a practical instrument constructed by me, the form 34 was 35.996 inches in circumference, ⅛ of an inch thick, and 3 inches wide, and the winding of wire 35 was started a quarter of an inch from one end of the form and continued to within a quarter of an inch of the opposite end of the form, so that the winding extended uniformly for 355 degrees, while a 5 degree portion of the form was unwound.

The gravity affected element 18 comprises a copper or other suitable bar 37 having the hub 17 located at its approximate center and provided at its upper end on the inward side thereof with the roller brush or contactor which is generally designated 38, and on its lower end with the over-balancing weight 39.

The brush 38 is composed of the block 40 which is connected by screws 41 to the inner side of the bar 37 and which has a key-shaped bore therein receiving the key-shaped slide 42 which is a part of the U-shaped bracket 43 across the arms of which is carried the shaft 44. Axial thrust ball bearings 45, 46 are placed adjacent the inner sides of the bracket 43 to engage the opposite ends of the roller 47 which is annular in form and is supported on the shaft 44 by means of a pair of axially spaced ball bearings 48, 49, respectively. A spring 50 in the bottom of the key-hole shaped bore presses the brush outwardly against the radially inward side of the resistor 33. The outwardly projecting weight 39 on the lower end of the bar 37 is of a suitable size to overbalance the brush and produce the requisite response of the gravity affected member to changes in inclination of the support on which the member is mounted. I have found that a bar 37 for use with a resistor whose measurements are given above, may have an approximate length of 11.208 inches weighted by a metal bob of eight ounces weight. The gravity affected element 18 is normally in a vertical or perpendicular position in which its brush contacts the circular resistor at the top or zero point.

The recalibrated voltmeter or indicator 51 has the indicator hand 52 arranged to be normally at the middle position indicating zero as indicated at 53 and to swing away from the zero point either toward the left or to the right to indicate right inclination or left inclination or dive or climb, according to the position and arrangement of the member, the voltage drop at the point of the resistor contacted by the brush affording the indication on the dial.

It is arranged that the voltage drop at any point of the resistor corresponds to a particular predetermined number of degrees of inclination, so that the dial 51 will indicate in degrees the amount of right or left list or climb or dive of the object on which the unit is mounted. The half scale reading on the voltmeter corresponds to the zero 53. If the casing 8 be tilted toward the right, the resulting measured voltage drop across the resistor increases and the hand 52 on the 6 volt D. C. voltmeter 51 will move toward the right, and the corresponding opposite movement takes place when the casing is tilted toward the left.

The gap of 5 degrees in the circular resistor is a mechanical and electrical necessity in view of present knowledge. This gap introduces a deficiency of wire of 2½ degrees to the right and 2½ degrees to the left. This deficiency at the up-side-down point is divided over the entire scale so that by utilizing a 6 volt D. C. voltmeter with ten scale divisions per volt, the true reading per half division would be 2.958 degrees. For practical purposes this will be recalibrated as 3 degrees per half division to the right or to the left. The scale of the dial 51 from 90 to 180 degrees to the right and from 90 to 180 degrees to the left will be made in a contrasting color, such as red, so as to positively warn the operator that the up-side-down position, for instance of the aircraft, is being attained. The dial may be marked to the left and to the right, respectively, for "climb" and "dive", according to the arrangement of the resistor with respect to the axis of the craft.

It will be observed that the construction described permits mounting the meter or dial 51 wherever it may be wanted, simply by extending the wires connecting it with the member 6 or 7, the members 6 and 7 being capable of being located in any part of the craft found convenient, even though considerably remote from the dial or dials.

It will also be observed that contrary to the practice in certain inclinometer instruments now available and instruments for showing lateral inclination with respect to the horizontal plane, the meter of the invention points toward the right when the list is toward the right and to the left when the list is toward the left, and in corresponding manner when the inclination of the craft is that of a dive or a climb, thereby positively and most simply showing the operator the position of his craft, without requiring the operator to reflect upon an existing opposite indication from what is actually taking place.

Figure 7:
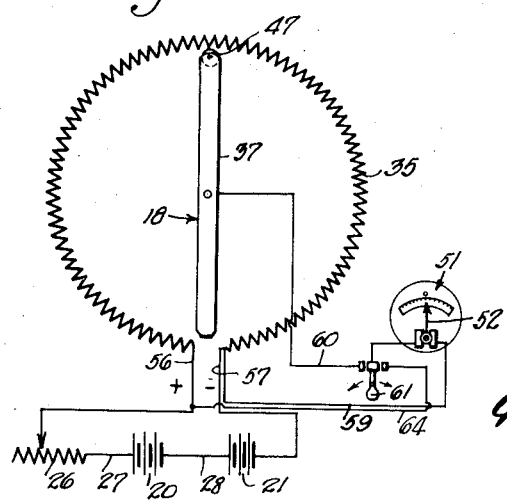
Figure 7 is a wiring diagram of one of the said members.
Figure 10:
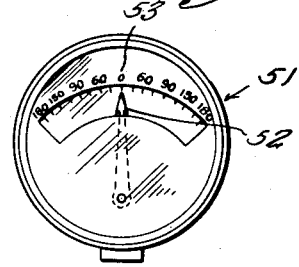
Figure 10 is an elevational view of the face of one of the dials which is a voltmeter having the indicia thereof changed to read in degrees instead of in volts.

As indicated in Figure 7 the adjustable rheostat 26 is connected by the wire 56 to one end of the coil 35 while the opposite end of the coil 35 is connected by a wire 57 to the negative side of the battery 21. Another wire 59 connects the last-mentioned end of the coil 35 to one side of the voltmeter or visual indicator 51 while the opposite side of the indicator is connected to the blade 61 of a single pole double-throw switch which has one pole connected by the wire 60 to the hub portion of the bar 37 which is a conductor carrying the current through its roller contact to the coil 35.

The remaining pole of the testing switch is connected by a wire 64 to the end of the coil 35 to which the wire 56 is connected. When the switch blade 61 is engaged with the right hand pole for the purpose of testing the battery voltage, the meter 51 is connected directly across the entire coil 35. The rheostat 26 is then adjusted until the meter reads 180°. After this voltage test and adjustment the switch blade 61 is thrown back to its initial position, which is in engagement with the left hand pole, in which position of the switch blade 61 the positive side of the meter is connected to the gravity affected element or bar 37, and the device of the invention is in operative condition. The switch blade 61 is shown in a neutral position in Figure 7.

Although I have shown and described herein a preferred embodiment of my invention, it is to be definitely understood that I do not desire to limit the application of the invention thereto, and any change or changes may be made in materials, and in structure and arrangement of parts, within the spirit of the invention and the scope of the subjoined claim.

What is claimed is:—

A variable resistor comprising a panel, an annular form secured to the panel, a resistance element disposed circumferentially on the form, a block secured to the panel and having a stud shaft extending therefrom, a pendulum arm having a hollow hub, a weight at the lower end of the arm, a contactor at the upper end of the arm, a bearing in the hollow hub, said contactor consisting of a block secured to the arm and having a pocket therein, a roller contact, a mount for the roller contact, said pocket having a groove therein disposed longitudinally, a shank on the mount having a rib slidably disposed in the groove, and a spring in the pocket between the lower end thereof and the inner end of the shank for forcing the contactor outwardly so that the roller will tensionally bear against the resistance element.

GEORGE A. THOMPSON.